United States Patent
John et al.

(10) Patent No.: US 11,641,348 B2
(45) Date of Patent: *May 2, 2023

(54) DYNAMIC OFFLINE ENCRYPTION

(71) Applicant: Visa International Service Association, San Francisco, CA (US)

(72) Inventors: Rhidian John, Helen's Bay (GB); Bartlomiej Piotr Prokop, Belfast (GB); Michael Palmer, Reading (GB)

(73) Assignee: Visa International Service Association, San Francisco, CA (US)

( * ) Notice: Subject to any disclaimer, the term of this patent is extended or adjusted under 35 U.S.C. 154(b) by 283 days.

This patent is subject to a terminal disclaimer.

(21) Appl. No.: 17/081,933

(22) Filed: Oct. 27, 2020

(65) Prior Publication Data

US 2021/0112041 A1 Apr. 15, 2021

Related U.S. Application Data

(63) Continuation of application No. 16/664,561, filed on Oct. 25, 2019, which is a continuation of application No. 15/813,749, filed on Nov. 15, 2017, now Pat. No. 10,498,705.

(51) Int. Cl.
*H04L 9/40* (2022.01)
*H04L 9/32* (2006.01)
*H04L 9/08* (2006.01)

(52) U.S. Cl.
CPC .......... *H04L 63/0457* (2013.01); *H04L 9/083* (2013.01); *H04L 9/088* (2013.01); *H04L 9/3213* (2013.01); *H04L 9/3247* (2013.01); *H04L 63/0435* (2013.01); *H04L 63/0442* (2013.01); *H04L 63/061* (2013.01); *H04L 63/0853* (2013.01); *H04L 63/123* (2013.01); *H04L 2209/56* (2013.01)

(58) Field of Classification Search
CPC ............ H04L 63/0457; H04L 63/0442; H04L 63/0435; H04L 63/061; H04L 63/0853; H04L 63/123; H04L 9/083; H04L 9/088; H04L 9/3213; H04L 2209/56
See application file for complete search history.

(56) References Cited

U.S. PATENT DOCUMENTS

| 6,363,480 | B1 | 3/2002 | Perlman |
| 10,498,705 | B2 | 12/2019 | John et al. |
| 10,855,663 | B2 | 12/2020 | John et al. |

(Continued)

OTHER PUBLICATIONS

EP18878146.2 , "Extended European Search Report", dated Mar. 22, 2021, 12 pages.

(Continued)

*Primary Examiner* — Hee K Song
(74) *Attorney, Agent, or Firm* — Kilpatrick Townsend & Stockton LLP

(57) ABSTRACT

A method for encrypting data when a device is offline is disclosed. In the method, a determination is made as to whether a successful connection with a remote server computer can or cannot be made. If a connection cannot be made, then data can be encrypted with an ephemeral public key. Later, then a connection is available, the encrypted data can be transmitted to the remote server computer for processing.

20 Claims, 8 Drawing Sheets

(56) References Cited

U.S. PATENT DOCUMENTS

| | | |
|---|---|---|
| 2008/0059787 A1* | 3/2008 | Hohenberger ........ H04L 9/3073 |
| | | 713/153 |
| 2012/0230308 A1 | 9/2012 | Saito et al. |
| 2012/0239572 A1 | 9/2012 | Wolfs et al. |
| 2012/0331284 A1 | 12/2012 | Kouladjie et al. |
| 2013/0066786 A1 | 3/2013 | Joyce |
| 2014/0143155 A1* | 5/2014 | Karlov ................ G06Q 20/352 |
| | | 705/71 |
| 2015/0019443 A1 | 1/2015 | Sheets et al. |
| 2016/0063275 A1 | 3/2016 | Cho et al. |
| 2016/0147944 A1 | 5/2016 | Douglass |
| 2017/0017957 A1 | 1/2017 | Radu |
| 2017/0201520 A1 | 7/2017 | Chandoor et al. |

OTHER PUBLICATIONS

U.S. Appl. No. 15/813,749 , Notice of Allowance, dated Jul. 25, 2019, 9 pages.
U.S. Appl. No. 16/664,561 , Notice of Allowance, dated Jul. 28, 2020, 10 pages.
Application No. PCT/US2018/055472 , International Preliminary Report on Patentability, dated May 28, 2020, 6 pages.
Application No. PCT/US2018/055472 , International Search Report and Written Opinion, dated Jan. 30, 2019, 9 pages.
EP18878146.2 , "Partial Supplementary European Search Report", dated Nov. 27, 2020, 11 pages.

\* cited by examiner

| KEY ID | PUBLIC KEY | PRIVATE KEY | ACTIVE | TIME TO LIVE |
|---|---|---|---|---|
| 1111 | 83 HD 0KQI 79H6 PQ01 | 922B F01B 2F40 C744 | YES | 1 DAY |
| 2222 | JRON ME77 8265 JN7W | E069 EA97 FC20 5E35 | NO | 1 DAY |
| 3333 | 7Y9X Z8OW 13Y7 B81G | 4811 7D86 BC8F BAFI | NO | 1 DAY |
| 4444 | PL01 7D3K J943 6219 | 3048 0241 00C9 18FA | NO | 1 DAY |
| 5555 | 0R8L IBET 7 IPA S3B9 | 4856 IFNA HAS2 3R4J | NO | 1 DAY |
| ... | | | | |

FIG. 5

| ENC(PAN) | ENC(CVV) | KEY ID | VALUE | TIME TO LIVE | SVC CODE |

600

| PAN | CVV | KEY ID | VALUE | TIME TO LIVE | SVC CODE |

602

| PAN | CVV | NULL | VALUE | TIME TO LIVE | SVC CODE |

DYNAMIC OFFLINE ENCRYPTION

CROSS-REFERENCES TO RELATED APPLICATIONS

This application is a continuation of U.S. patent application Ser. No. 16/664,561, filed on Oct. 25, 2019, which is a continuation application of U.S. patent application Ser. No. 15/813,749 filed Nov. 15, 2017, now U.S. patent Ser. No. 10/498,705. The above-referenced patent applications are herein incorporated by reference in its entirety.

BACKGROUND

Secure data transmission can be interrupted by many factors, including network outages, poor connectivity, and blackouts. For example, an airplane may try to send access data (e.g., a PIN, password, credit card data) acquired from a passenger to an authorizing entity, but may be unable to do so, due to a poor Internet connection when in flight.

In some cases, if a connection to the authorizing entity cannot be made, a static, long-life, symmetric encryption key is used to encrypt the access data and the encrypted access data is then stored. After the airplane lands, the encrypted access data is then provided to a remote computer which decrypts the data and then obtains authorization for the transactions.

Although such data can be generally secure, it is possible that a hacker could gain possession of the encryption key. If this occurs, then data encrypted using the encryption key may be at risk. In some cases involving payment transactions, merchants need to create and maintain their own static key while complying with the payment card industry data security standard (PCI DSS) requirements. Complying with these rules can be burdensome.

In some cases, no encryption method is used when storing the access data. This is in violation of storage compliance rules as outlined in PCI DSS, and thus poses a major security risk. For example, a traveling salesman may be in areas where Internet connectivity is not reliable. The traveling salesman may store access data on their laptop computer until they regain Internet connectivity. This poses a problem, since the laptop computer can be stolen and the access data can be obtained from the laptop computer.

Embodiments of the invention address these and other problems individually and collectively.

BRIEF SUMMARY

Embodiments of the invention are directed to methods and systems of improving offline encryption when obtaining access data from an access device.

One embodiment of the invention is directed to a method comprising: receiving, by an access device, a first key identifier, and a first ephemeral public key corresponding to a first ephemeral private key, the first ephemeral public and private keys being previously generated by a key management server; receiving, by the access device, access data associated with a user; determining, by the access device, whether a successful connection with a remotely located processing computer can be made; when the access device determines that a successful connection cannot be made, then encrypting the access data with the first ephemeral public key to form encrypted access data; storing, in a memory device associated with the access device, the encrypted access data; determining, by the access device, that a successful connection to the remotely located processing computer can be made; transmitting, by the access device, the encrypted access data and the first key identifier to the remotely located processing computer in an authorization request message, wherein the remotely located processing computer communicates with the key management server to decrypt the access data; receiving, by the access device, an authorization response message from the remotely located processing computer; and receiving, by the access device, a second key identifier, and a second ephemeral public key corresponding to a second ephemeral private key, the second ephemeral public and private keys being previously generated by the key management server.

Another embodiment of the invention is directed to the access device configured or programmed to perform the above-noted method.

Another embodiment of the invention is directed to a method comprising: receiving, by a key management server, a first key request message comprising a request for a first key identifier, and a first ephemeral public key corresponding to a first ephemeral private key; transmitting, by the key management server, the first key identifier and the first ephemeral public key corresponding to the first ephemeral private key, the first ephemeral public and private keys being previously generated by the key management server, to an access device; c) receiving, by the key management server, a decryption request message to decrypt encrypted access data using the first ephemeral private key corresponding to the first ephemeral public key, from a processing computer; decrypting, by the key management server, the encrypted access data; transmitting, by the key management server, decrypted access data to the processing computer; f) receiving, by the key management server, a second key request message comprising a request for a second key identifier, and a second ephemeral public key corresponding to a second ephemeral private key; and g) transmitting, by the key management server, the second key identifier and the second ephemeral public key corresponding to the second ephemeral private key to the access device.

Another embodiment of the invention is directed to the key management server configured or programmed to perform the above-noted method.

Further details regarding embodiments of the invention can be found in the Detailed Description and the Figures.

BRIEF DESCRIPTION OF THE DRAWINGS

FIG. 5 shows a block diagram illustrating a key database according to an embodiment of the invention.

FIG. 6 shows a block diagram illustrating access data according to an embodiment of the invention.

DETAILED DESCRIPTION

Figure 1:
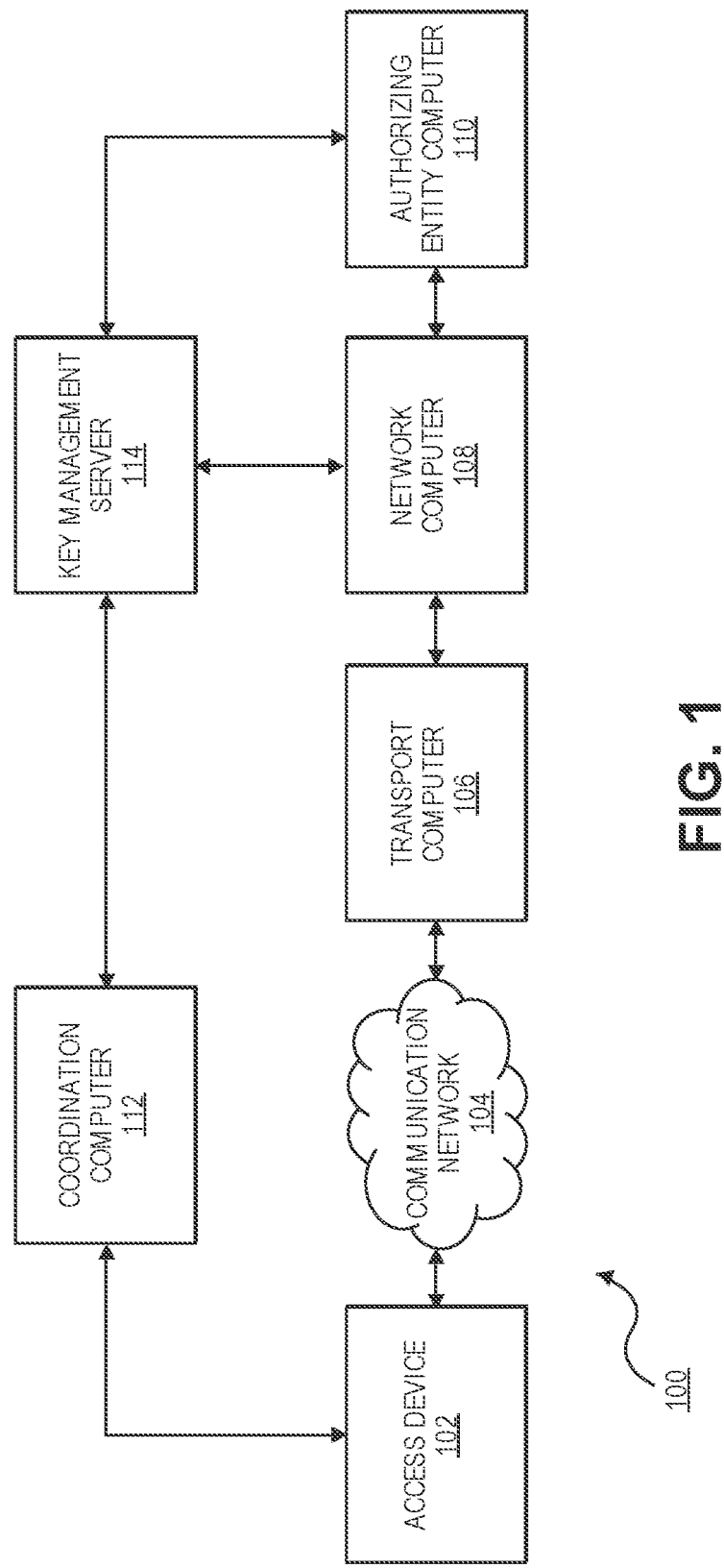
FIG. 1 shows a block diagram of a system illustrating a dynamic offline encryption system according to embodiments of the present invention.

Prior to discussing embodiments of the invention, some terms can be described in further detail.

A "key" may refer to a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

An "ephemeral public key" may include a cryptographic key that forms a public key of an ephemeral public/private key pair. In some cases, an ephemeral public key can be used for only a limited period of time or a limited number of times. In some cases, it is used for one event such as one airplane flight, one time period, or one transaction. The ephemeral public key may be designed to be shared and may be configured such that any information encrypted with the ephemeral public key may only be decrypted using an ephemeral private key associated with the ephemeral public key.

An "ephemeral private key" may include a cryptographic key that forms a private key of an ephemeral public/private key pair. An ephemeral private key may be used to decrypt data encrypted with an ephemeral public key.

A "key identifier" or "key ID" can be any identifier corresponding to a related key. The key identifier can be in any suitable form and may include any suitable number of characters.

A "digital signature" may refer to the result of applying an algorithm which allows a signing party to manifest, and a verifying party to verify, the authenticity and integrity of data. For example, for a public/private key pair, the signing party may act by means of the private key and the verifying party may act by means of the public key. This process may certify the authenticity of the sender and the integrity of the signed document because of the so-called principle of non-repudiation which does not allow disowning what has been signed. A certificate or other data that includes a digital signature by a signing party is said to be "signed" by the signing party.

An "access device" may be any suitable device that provides access to a remote system. An access device may also be used for communicating with a coordination computer, a communication network, or any other suitable system. An access device may generally be located in any suitable location, such as at the location of a merchant. An access device may be in any suitable form. Some examples of access devices include POS or point of sale devices (e.g., POS terminals), cellular phones, personal digital assistants (PDAs), personal computers (PCs), tablet PCs, hand-held specialized readers, set-top boxes, electronic cash registers (ECRs), automated teller machines (ATMs), virtual cash registers (VCRs), kiosks, security systems, access systems, and the like. In some embodiments, an access device can be a device that acts as a payment terminal on an airplane or other vehicle. On an airplane, payment terminals may be in front of passengers on the seatbacks in front of them. Or, they may be handheld terminals used by flight attendants to process purchases made by passengers. In some embodiments, where an access device may comprise a POS terminal, any suitable POS terminal may be used and may include a reader, a processor, and a computer-readable medium.

An access device may use any suitable contact or contactless mode of operation to send or receive data from, or associated with, a mobile communication or payment device. For example, access devices can have card readers that can include electrical contacts, radio frequency (RF) antennas, optical scanners, bar code readers, or magnetic stripe readers to interact with portable devices such as payment cards.

"Access data" may include any suitable data that can be used to access a resource or create data that can access a resource. In some embodiments, access data may be account information for a payment account. Account information may include a PAN, payment token, expiration date, card verification values (e.g., CVV, CVV2), dynamic card verification values (dCVV, dCVV2), etc. In other embodiments, access data could include data that can be used to access a location or to access secure data. Such information may be ticket information for an event, data to access a building, transit ticket information, passwords, biometrics or other credentials to access secure data, etc.

An "authorization request message" may be an electronic message that requests authorization for an interaction. In some embodiments, it is sent to a transaction processing computer and/or an issuer of a payment card to request authorization for a transaction. An authorization request message according to some embodiments may comply with International Organization for Standardization (ISO) 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction. The code may serve as proof of authorization.

An "authorizing entity" may be an entity that authorizes a request. Examples of an authorizing entity may be an issuer, a governmental agency, a document repository, an access administrator, etc. An authorizing entity may operate an authorizing entity computer. An "issuer" may refer to a business entity (e.g., a bank) that issues and optionally maintains an account for a user. An issuer may also issue payment credentials stored on a user device, such as a cellular telephone, smart card, tablet, or laptop to the consumer.

A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

A "gateway computer" can be a server computer or a series of server computers that are configured to communicate with a device. The gateway computer may communicate with the device using over-the-air (OTA) messages or using any other communication networks and protocols. For example, the gateway computer may be configured to provide a secure communications channel (i.e., secure channel) with a device over which information can be transmitted securely to and from the device using a communications network, the Internet, and/or any other relevant communications network.

A "successful connection" can refer to the ability for two entities to successfully communicate with each other. In some instances, a successful connection may include the ability to reliably transmit data from one entity to another.

A "processor" may refer to any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processing computer" may be any suitable computation apparatus that can process data. In some embodiments, processing computers may be remotely located with respect to any external computers that may be requesting that data be processed. Exemplary processing computers may include a key management server, a transport computer, a network computer, a gateway computer, and an authorizing entity computer.

FIG. 1 shows a block diagram of a system 100 comprising a number of components according to some embodiments of the invention. The system comprises an access device 102, a communication network 104, a transport computer 106, a network computer 108, an authorizing entity computer 110, a coordination computer 112, and a key management server 114, which may all be in operative communication with each other.

Messages between the entities, providers, networks, and devices illustrated in FIG. 1 may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

The communication network 104 may include any suitable communication medium. The communication network 104 may be one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

The coordination computer 112 may transmit and receive messages from the access device 102, as well as a number of other access devices. In some embodiments, the coordination computer 112 may be a central computer on a vehicle such as an airplane. The access device 102 may be a payment terminal on the back of a seat in front of an airplane passenger or a handheld terminal that is used by an airline attendant to process payments using payment devices such as payment cards. The coordination computer 112 can communicate with many of the payment terminals on the airplane, and may serve as a central communication point to allow the airplane to receive messages from a remote computer or transmit messages to the remote computer.

In some embodiments, the coordination computer 112 may be in direct communication with the communication network 104. In other embodiments, the access device 102 may communicate with the communication network 104 through the coordination computer 112. Thus, in an embodiment of the invention, the coordination computer 112 may transmit the unencrypted access data, encrypted access data, ephemeral public keys, authorization request messages, authorization response messages, etc. between the access device 102, and the communication network 104 and/or the key management server 114.

The key management server 114 can generate, manage, and/or transmit and receive ephemeral public and/or private keys.

The transport computer 106 be located between (in an operational sense) the access device 102 and the network computer 108. The transport computer 106 may be operated by an entity such as an acquirer. An acquirer can maintain an account of any merchants (e.g., an airline) with which users may wish to interact.

The network computer 108 may route or switch messages between a number of transport computers including the transport computer 106, and a number of authorizing entity computers including the authorizing entity computer 110. The network computer 108 may be a processing network computer in some embodiments. The processing network computer may be configured to provide authorization services, and clearing and settlement services for payment transactions. A processing network computer may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular includes a Visa Integrated Payments (VIP) system which processes authorization requests and a Base II system which performs clearing and settlement services. Furthermore, the payment processing network may include a server computer and may use any suitable wired or wireless telecommunications network, including the Internet. In some embodiments, the processing network computer may forward an authorization request received from a transport computer to the authorizing entity computer via a communication channel. The processing network computer may further forward an authorization response message received from the authorizing entity computer to the transport computer.

The authorizing entity computer 110 may be configured to authorize any suitable request, including access to data, access to a location, or approval for a payment. In some embodiments, the authorizing entity computer 110 may be operated by an account issuer. Typically, the issuer is an entity (e.g., a bank) that issues and maintains an account of a user. The account may be a credit, debit, prepaid, or any other type of account.

Figure 2:
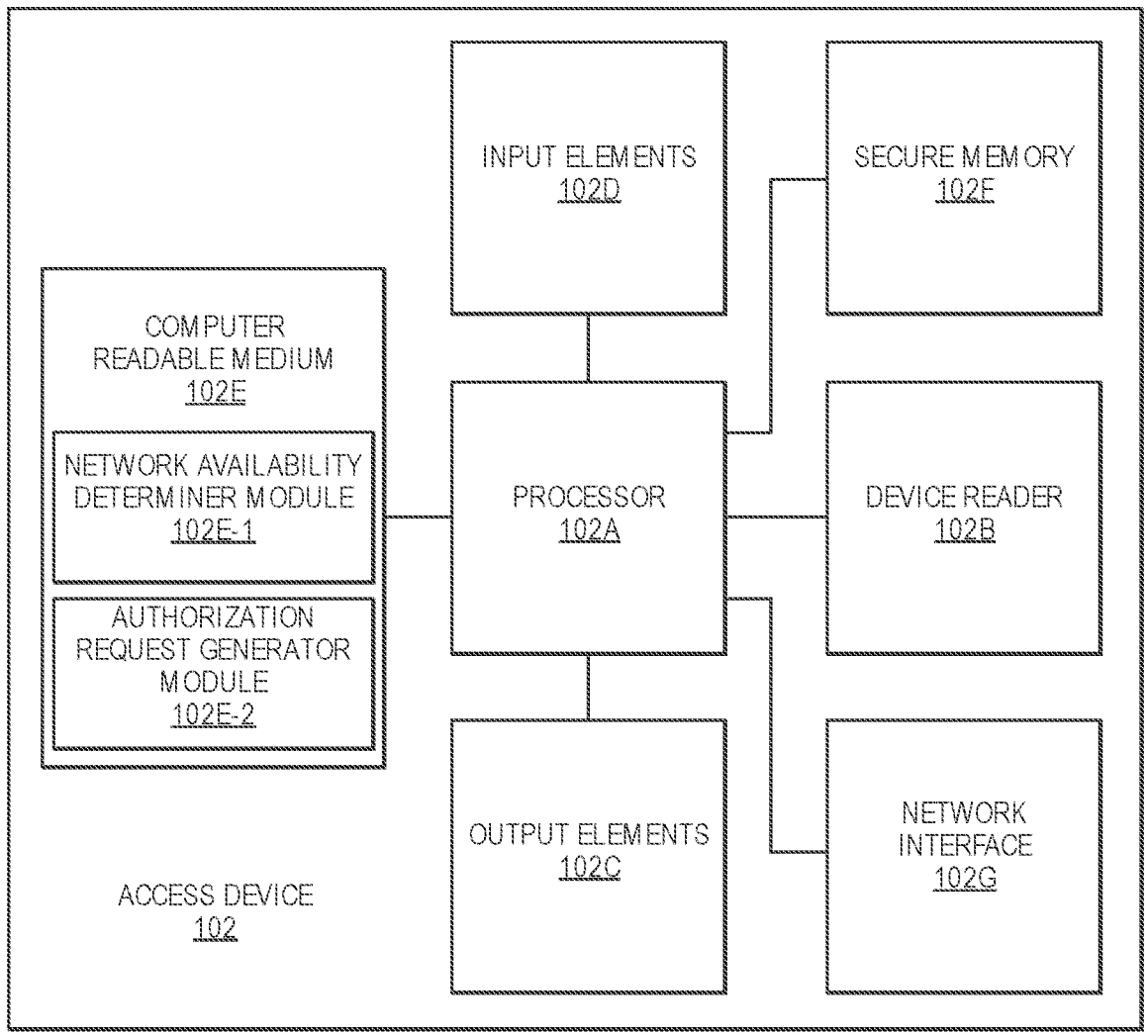
FIG. 2 shows a block diagram illustrating an access device according to an embodiment of the invention.

FIG. 2 shows a block diagram of an access device 102 according to some embodiments of the invention. The exemplary access device 102 may comprise a processor 102A. The processor 102A may be coupled to a device reader 102B, one or more output elements 102C, one or more input elements 102D, a non-transitory computer readable medium 102E comprising a network availability determiner module 102E-1 and an authorization request generator module 102E-2, a secure memory 102F, and a network interface 102G.

The device reader 102B may comprise any suitable device capable of reading data from a portable device such as an access card (e.g., a credit card). The device reader 102B include antennas, electrical contacts, etc., and can read data on memory chips or magnetic stripes on portable device such as cards.

The one or more output elements 102C may comprise any suitable device(s) that may output data. Examples of output elements 102C may include display screens, speakers, and data transmission devices.

The one or more input elements 102D may include any suitable device(s) capable of inputting data into the access device 102. Examples of input devices include buttons, touchscreens, touch pads, microphones, etc.

The computer readable medium 102E may comprise code, executable by the processor 102A, to implement a method comprising: receiving, a first key identifier, and a first ephemeral public key corresponding to a first ephemeral private key, the first ephemeral public and private keys being previously generated by a key management server; receiving access data associated with a user; determining, by the access device, whether a successful connection with a remotely located processing computer can be made; when the access device determines that a successful connection cannot be made, then encrypting the access data with the first ephemeral public key to form encrypted access data; storing, in a memory device associated with the access device, the encrypted access data; determining that a successful connection to the remotely located processing computer can be made; transmitting the encrypted access data and the first key identifier to the remotely located processing computer in an authorization request message, wherein the remotely located processing computer communicates with the key management server to decrypt the access data; receiving an authorization response message from the remotely located processing computer; and receiving a second key identifier, and a second ephemeral public key corresponding to a second ephemeral private key, the second ephemeral public and private keys being previously generated by the key management server.

The network availability determiner module 102E-1 may comprise software code that can determine if a network is available or not, such that a successful connection can be made between the access device and a remote processing computer. In some embodiments, the network availability determiner module 120E-1 may comprise code for determining if a successful connection can be made, based upon whether or not an authorization response message is received in response to the transmission of an authorization request message. If an authorization request message is transmitted by the access device 102 and a corresponding authorization response message is not received at all, or is received after an unreasonable delay, then the network availability determiner module 102E-1 may determine, in conjunction with the processor 102A, that a successful connection cannot be made. In other embodiments, the network availability determiner module 102E-1 and the processor 102A may determine if a successful connection is possible based upon other factors such as the observed signal strength, past interaction data, etc. With regard to past interaction data, for example, the network availability determiner module 102E-1 and the processor 102A may determine, based upon past data, that an airplane flying over the Rocky Mountains will typically not have any connectivity with a remote computer.

The authorization request generator module 102E-2 may be an application executable by the computer readable medium 102E. The authorization request generator module 102E-2 may generate an authorization request message.

The secure memory 102F may store encrypted access data, key identifiers, public keys, and any other relevant data securely. The secure memory 102F may be in the form of a secure element, a hardware security module, or any other suitable form of secure data storage.

The network interface 102G may include an interface that can allow the access device 102 to communicate with external computers. Network interface 220 may enable the access device 102 to communicate data to and from another device (e.g., resource provider computer, authorization computer, etc.). Some examples of network interface 102G may include a modem, a physical network interface (such as an Ethernet card or other Network Interface Card (NIC)), a virtual network interface, a communications port, a Personal Computer Memory Card International Association (PCM-CIA) slot and card, or the like. The wireless protocols enabled by network interface 102G may include Wi-Fi™.

Data transferred via network interface 102G may be in the form of signals which may be electrical, electromagnetic, optical, or any other signal capable of being received by the external communications interface (collectively referred to as "electronic signals" or "electronic messages"). These electronic messages that may comprise data or instructions may be provided between network interface 102G and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

Figure 3:
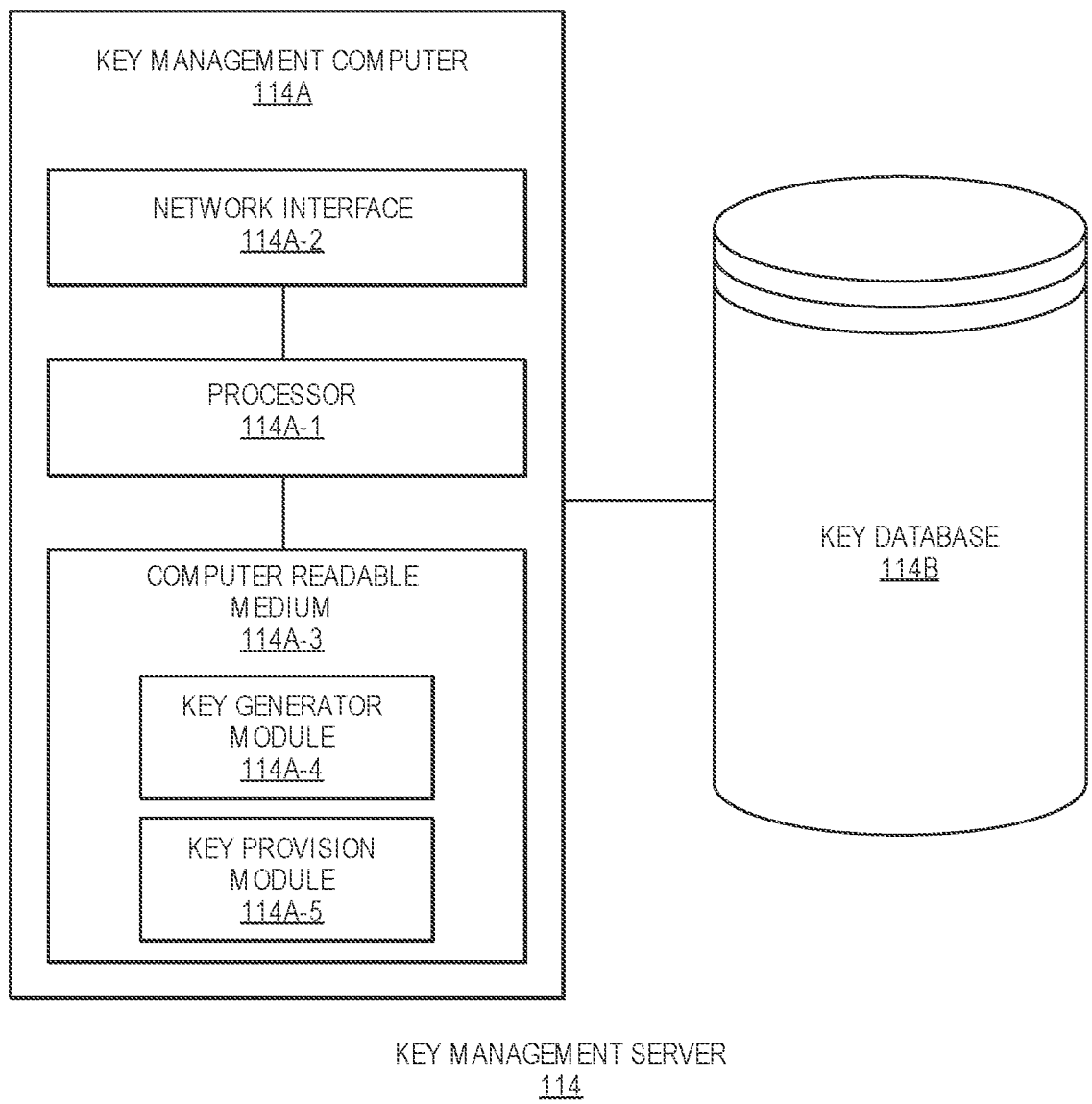
FIG. 3 shows a block diagram illustrating a key management server computer according to an embodiment of the invention.

FIG. 3 shows a block diagram of a key management server 114 according to an embodiment of the invention. The exemplary key management server 114 may comprise, but is not limited to a key management computer 114A and a key database 114B. The key management computer 114A may comprise a processor 114A-1, a network interface 114A-2, and a computer readable medium 114A-3. In some embodiments, the computer readable medium may comprise code, executable by the processor 114A-1 to implement a method. The method may comprise: receiving a first key request message comprising a request for a first key identifier, and a first ephemeral public key corresponding to a first ephemeral private key; transmitting the first key identifier and the first ephemeral public key corresponding to the first ephemeral private key, the first ephemeral public and private keys being previously generated by the key management server, to an access device; receiving a decryption request message to decrypt encrypted access data using the first ephemeral private key corresponding to the first ephemeral public key, from a processing computer; decrypting the encrypted access data; transmitting decrypted access data to the processing computer; receiving a second key request message comprising a request for a second key identifier and a second ephemeral public key corresponding to a second ephemeral private key; and transmitting the second key identifier and the second ephemeral public key to the access device. The computer readable medium 114A-3 may also comprise a key generator module 114A-4 and a key provision module 114A-5.

The key database 114B may securely store data, such as public/private key pairs. The key database 114B may be a conventional, fault tolerant, relational, scalable, secure database such as those commercially available from Oracle™ or Sybase™.

The network interface 114A-2 may include an interface that can allow the key management server to communicate with external computers. It may have similar properties and/or characteristics as the network interface 102G in the access device 102.

The key generator module 114A-4 may comprise code for generating encryption keys such as public/private key pairs.

The key provision module 114A-5 may comprise code for provisioning encryption keys to access devices and/or coordination computers.

Figure 4A:
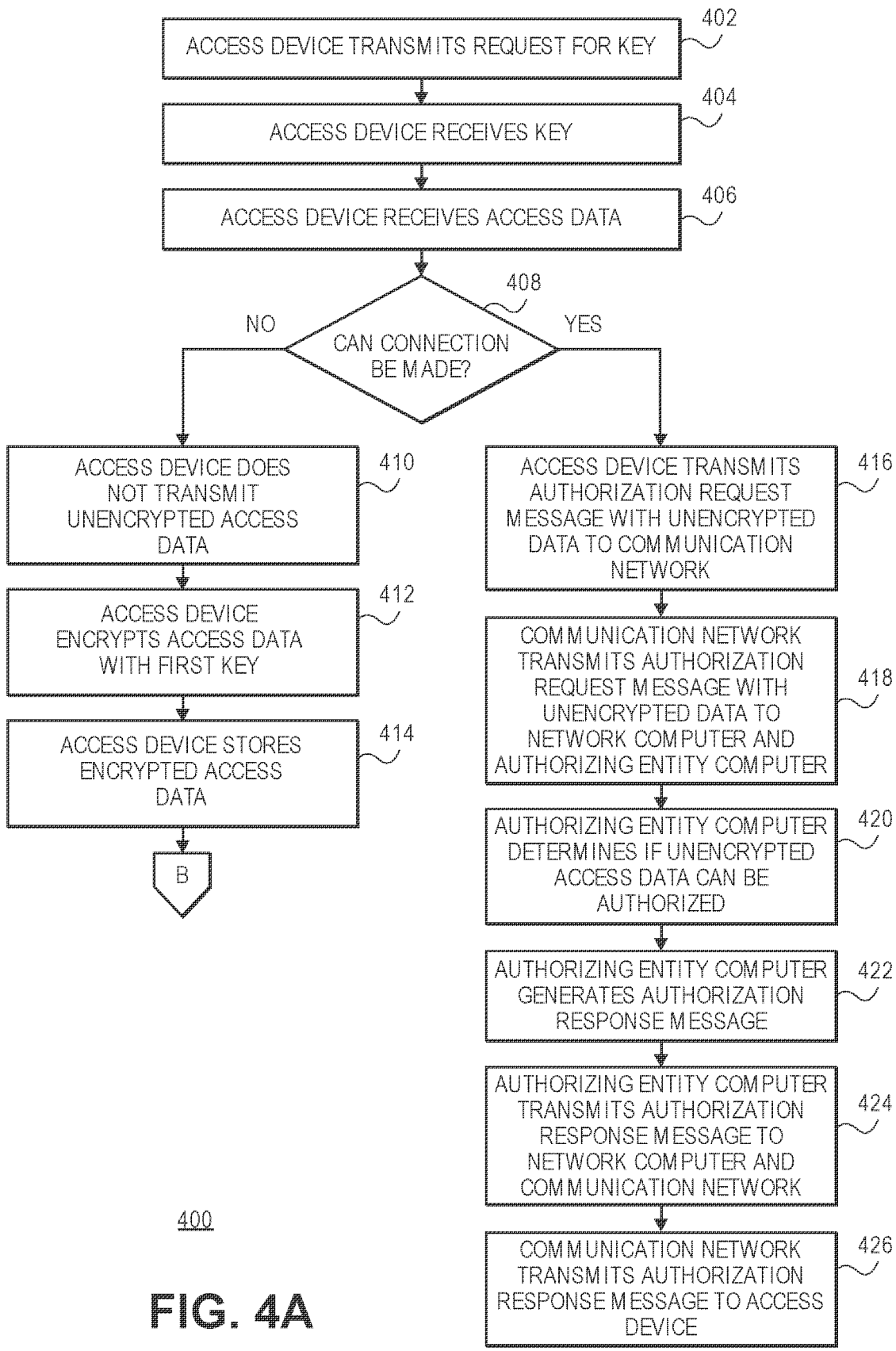
FIG. 4A shows a flow diagram illustrating a dynamic offline encryption process according to an embodiment of the invention.

FIG. 4A shows a flow diagram illustrating a dynamic offline encryption method according to an embodiment of the invention. The method illustrated in FIG. 4A will be described in the context of an access device residing on an airplane. It is understood, however, that the invention can be applied to other circumstances (e.g., a cruise ship, a traveling salesperson, etc.) in which the ability to establish a successful connection between the access device and a remote computer is intermittent. Although the steps are illustrated in a specific order, it is understood that embodiments of the invention may include methods that have the steps in different orders. In addition, steps may be omitted or added and may still be within embodiments of the invention.

Steps 402 and 404 may occur when an airplane including the access device 102 and the coordination computer 112 is in communication with the key management server 114. For example, the airplane may be on the ground, at an airport, and may be in close proximity to any communication gateways that allow the coordination computer 112 and the access device to communicate with the key management server 114.

At step 402, the access device 102 may reside on the airplane and may transmit a key request message to the key management server 114, requesting a first key identifier and a first public key corresponding to a first private key. The access device 102 may include data that indicates the request time and the requested time by which to receive the first ephemeral public key and the key identifier. The request message may also include the number of requested public keys, the requested time to live on each of the requested public keys, and any other relevant request information.

In some embodiments, the access device 102 may transmit the key request message to the coordination computer 112, which may also reside on the airplane. The coordination computer 112 may then attempt to communicate with the key management server 114. The key management server 114 can receive the key request message and may then generate a first ephemeral public/private key pair. It may then transmit the first ephemeral public key to the access device 102. In other embodiments, the key management server 114 may generate the first ephemeral private key, the first ephemeral public key, and the key ID before receiving the key request message from the access device 102.

At step 404, the access device 102 may receive the requested first key ID and first public key from the key management server 114. The access device 102 may also receive the time to live associated with the first ephemeral public key and any other relevant information from the key management server 114.

At step 406, the access device 102 may receive access data from a user on the airplane. In some embodiments, the user may use a portable device such as a credit card to interact with the access device. For example, the user may take his credit card and insert it into a slot in the access device or swipe it through a slot in the access device. The device reader of the access device can read access data from the portable device. In other embodiments, the user can input access data such as a credit card number into the access device by using a keyboard or touchscreen.

At step 408, after the access device 102 has received the access data, the access device 102 may determine if a successful connection with the authorizing entity computer 110 can be made. In some embodiments, the network availability determiner module 102E-1 may use preexisting connection data from a connection history database on the plane. The access device 102 may determine that a successful connection between the authorizing entity computer 110 and the access device 102 cannot be made, without actually transmitting a request message to the network computer. For example, past flight data may indicate that a connection to an external computer is not possible if the plane is flying over the Rocky Mountains. Thus, the access device 102 may determine the current location of the airplane, and may determine that a successful connection is not possible. In another example, the network availability determiner module 102E-1 and the processor located on an access device 102 on an airplane may survey connection data from other devices located on the airplane. If other devices (e.g., the laptop computers, phones and tablets of the airplane's passengers) are able to connect to remote computers using, for example, Wi-Fi, then the network availability determiner module 102E-1 may determine that a successful connection is possible, and the method may proceed to step 416, described below. However, if other devices located on the airplane are not able to connect to remote computers external to the airplane using Wi-Fi, then the network availability determiner module 102E-1 may determine that a successful connection is not possible, and the method may proceed to step 410, described below.

In other embodiments, in determining whether a successful connection to the network computer can be made, the access device 102 may first attempt to transmit an initial authorization request message to the network computer. If the access device 102 receives an error message or no response to the initial authorization request message, the access device 102 may proceed to step 410. If the access device 102 receives an initial authorization response message, then the access device may proceed to step 416. The initial authorization response message could be a no dollar or zero dollar authorization in some embodiments. In yet other embodiments, the determination as to whether a successful connection can be made can be based on the recent successful transmission of an authorization request message and receipt of an authorization response message for a prior, relatively recent transaction conducted by the passenger wanting to conduct the current interaction, or another passenger that conducted a recent interaction.

At step 416, after the access device 102 determines that a successful connection can be made, the access device 102 may generate and transmit an authorization request message comprising unencrypted access data to the authorizing entity computer 110 via the communication network 104.

At step 418, the communication network transmits the authorization request message comprising the unencrypted access data to the authorizing entity computer 110 via the transport computer 106 and the network computer 108.

At step 420, the authorizing entity computer 110 may determine if the transaction can be authorized. In some embodiments, the authorizing entity computer 110 can run any appropriate fraud checks on the transaction, and may evaluate whether or not the user conducting the transaction has sufficient funds and/or credit in his or her account. If he or she does, the transaction will be approved.

At step 422, the authorizing entity computer 110 may generate an authorization response message. The authorization response message may approve or decline the transaction.

At step 424, the authorizing entity computer 110 may transmit the authorization response message to the access device 102 via the communication network 104, the transport computer 106, and the network computer 108.

At step 426, the communication network 104 may transmit the authorization response message to the access device 102.

At some later point in time, the transport computer, the network computer, and the authorizing entity computer 110 may perform a clearing and settlement process along with other transactions.

If the access device 102 determines that a successful connection cannot be made, then the method proceeds to step 410.

At step 410, once the access device 102 determines that a successful connection cannot be made, the access device 102 may decide to not transmit the unencrypted access data. The access device 102 can be characterized as being in an "offline" mode.

At step 412, the access device 102 may encrypt the access data with the first public key to form encrypted access data so that the transaction can continue to be processed, even though a connection to a remote computer cannot be made.

At step 414, the access device 102 may store the encrypted access data in the secure memory 102F in the access device 102 until a successful connection can be made.

Figure 4B:
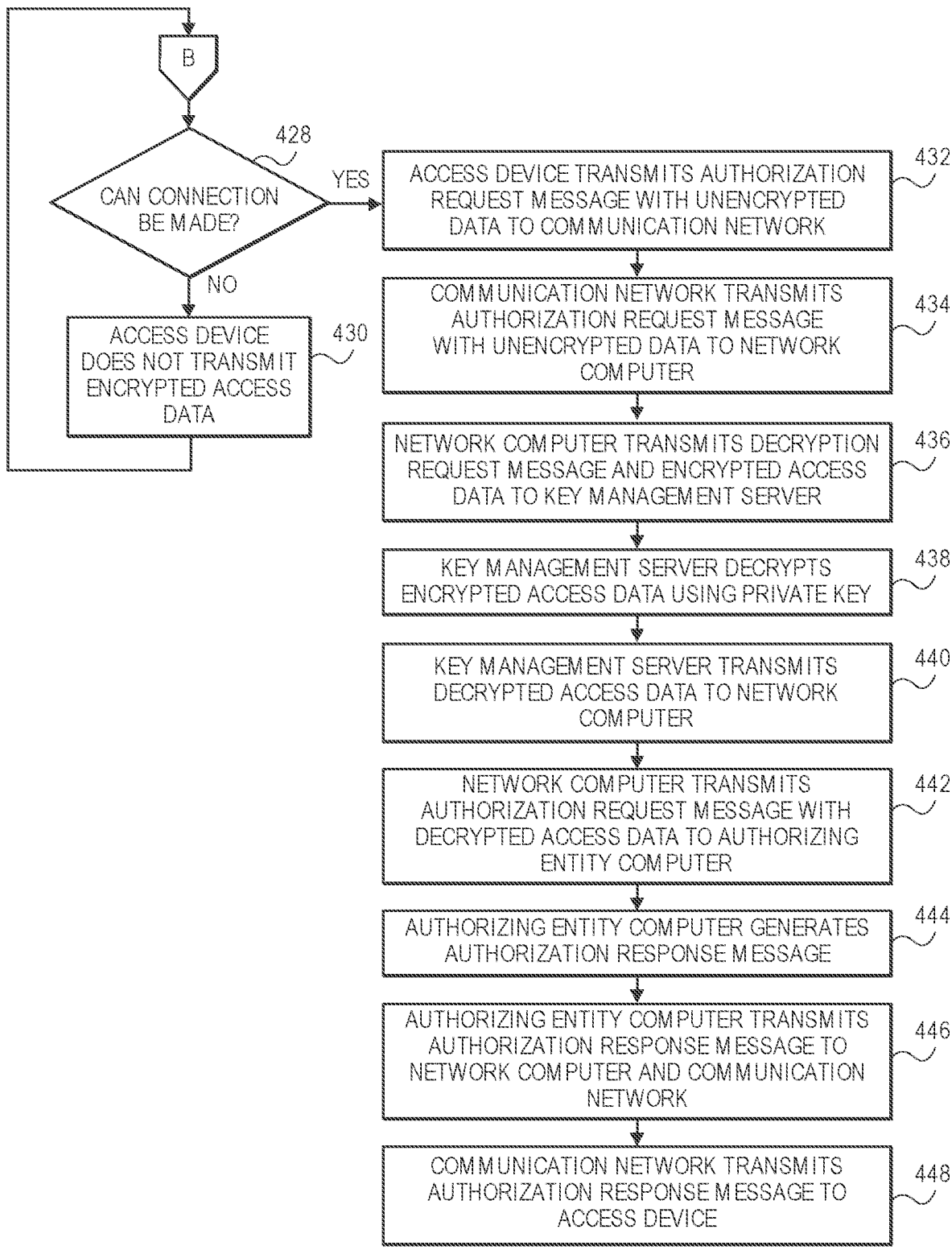
FIG. 4B shows a flow diagram illustrating a dynamic offline encryption process according to an embodiment of the invention.

Now referring to FIG. 4B, at step 428, the access device 102 may determine if a successful connection can be made (as described above). This may be done in the same or similar manner to step 408.

If the access device 102 determines that a successful connection cannot be made, then at step 432, the access device does not send the encrypted access data to the authorizing entity computer 110. In some embodiments, the access device 102 may perform the loop of steps 428 and 430 any number of times until a successful connection can be made, during which the access data may remain stored in the secure memory 102F.

If the access device determines that a successful connection can be made, then at step 428, the access device 102 may generate and transmit an authorization request message comprising the encrypted access data, and the key ID associated with the public key that was used to encrypt the access data, to the communication network 104.

At step 434, the communication network 104 may transmit the authorization request message comprising the encrypted access data and the key ID to the network computer 108.

At step 436, after the network computer 108 receives the authorization request message, the network computer 108 and generates and transmits a decryption request message to the key management server 114. The decryption request message may comprise the encrypted access data and the key ID.

In other embodiments, the access device 102, the communication network 104, or the transport computer 106 may generate the decryption request message instead of the network computer 108.

At step 438, after the key management server 114 receives the decryption request message, the key management server 114 may decrypt the encrypted access data using the associated first private key, after receiving the decryption request message. The key management server 114 may determine which private key to use by using the received first key ID. For example, the key management server 114 may use a key database 114B to store the association between the key IDs and the corresponding private keys. FIG. 5 shows an example of a portion of a key database 114B. The key management server 114 may determine if the received first key ID is associated with currently active public/private key pairs using the "key ID," "active," and "time to live" columns. In FIG. 5, an absolute number for "time to live" is shown. The database 114B may also have times when the encryption keys are generated so that the absolute numbers for the times to live can be used. The associated first private key may then be located in the key database 114B. In some embodiments, the key database 114b, as depicted in FIG. 5, may include other relevant columns of information, such as the access device ID that received the public key, and the time that the public key was delivered.

At step 440, after the key management server 114 decrypts the access data, the key management server 114 may transmit the decrypted access data to the network computer 108.

At step 442, after receiving the decrypted access data, the network computer 108 may generate a modified authorization request message to remove the encrypted access data and replace it with the decrypted access data. The modified authorization request message comprising the decrypted access data is then transmitted to the authorizing entity computer 110.

At step 444, after the authorizing entity computer 110 receives the authorization request message, the authorizing entity computer 110 may determine if the transaction is authorized or not. Then, the authorizing entity computer 110 may generate an authorization response message.

At step 446, the authorizing entity computer 110 may transmit the authorization response message to the network computer 108 and the communication network 104 via the transport computer 106. In some embodiments, network computer 108 may replace the unencrypted access data in the authorization response message with the encrypted access data to form a modified authorization response message. The modified authorization response message may then be transmitted to the communication network 104.

In some embodiments, the network computer 108 may transmit the authorization response message to the key management server 114 with a request to re-encrypt the access data with the public key. Further, the network computer 108 may request that the key management server 114 may digitally sign the authorization response message using the first private key. This adds a digital signature to the authorization response message. The key management server 114 may then transmit the authorization response message including the encrypted access data, and the digital signature to the access device 102.

At step 448, the communication network 104 may transmit the authorization response message to the access device 102.

In some embodiments, the access device 102 may store or process the authorization response message. After the authorization response message is received by the access device 102, the access device 102 may then repeat the dynamic offline encryption method. In some embodiments, the key management server 114 may receive a second key request message comprising a request for a second key ID, and a second public key corresponding to a second private key, from the access device 102. The key management server 114 may then transmit the second key ID, and the second public key to the access device 102. The access device 102 may receive the second public key corresponding to a second private key, the second public key and second private keys being previously generated by the key management server 114. In some embodiments, the key management server 114 may delete the first public key and first private key from memory after the access device 102 has received the second public key. The access device 102 may also delete the first public key upon receiving the second public key.

In yet other embodiments, the second public key could be transmitted from the key management server 114 to the access device 102, via the previously described authorization response message.

At this point, the access device 102 has the new ephemeral public key and the process shown and described with respect to FIGS. 4A and 4B can be repeated.

FIG. 5 shows a block diagram illustrating a key database according to an embodiment of the invention. The key database may include the "key ID," "public key," "private key," "active," and "time to live."

In some embodiments, the "active" data may either be set to "yes" or "no." There may be any number of active public/private key pairs at any given time. In other embodiments, the "time to live" data may be set to designate any amount of time, such as "2 days," "1 hour," "3 weeks," etc. In FIG. 5, an absolute number for "time to live" is shown.

The database 114B may also have times when the encryption keys are generated so that the absolute numbers for the times to live can be used. Times to live may also be expressed by time ranges (e.g., from 12 pm on Jan. 1, 2016 to 12 pm on Jan. 2, 2016).

FIG. 6 shows a block diagram illustrating data fields that may be present in authorization request messages in embodiments of the invention.

The data fields 600 may include data fields for encrypted access data, which may include the encrypted PAN, an encrypted CVV (card verification value), a key ID, a value (e.g., a transaction amount), a time to live for the encryption, and a service code (SVC). The authorization request message may also include a timestamp of when the message was transmitted so that the key management server can determine the current time is past the time to live. The data fields 600 may be present in an authorization request message that is sent from the access device to the network computer.

The data fields 602 may include data fields for decrypted access data, which may include an unencrypted PAN, an unencrypted CVV, the key ID, value, time to live, and service code. The data fields 602 may be present in an authorization request message that is sent from the network computer to the authorizing entity computer.

The data fields 604 may include data fields for unencrypted access data such as a PAN, a CVV, a "NULL" value to indicate that no encrypted data is present in the authorization request message, a value (e.g., transaction amount), a time to live, and a service code. The data fields 602 may be present in an authorization request message that is sent from the access device to the authorizing entity computer when the access device has a successful connection with the authorizing entity computer.

Figure 7:
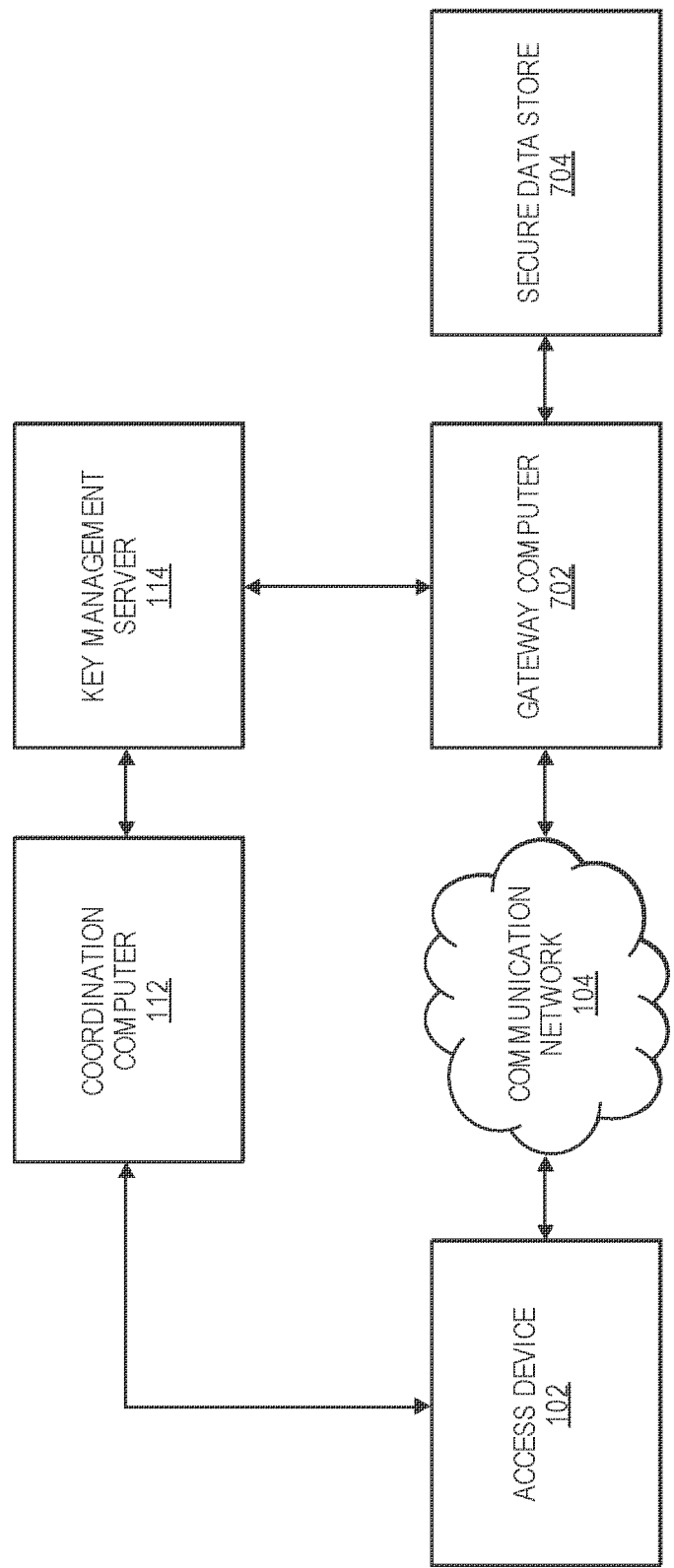
FIG. 7 shows a block diagram of a system illustrating a dynamic offline encryption system according to an embodiment of the invention.

FIG. 7 shows a block diagram of a system for performing a dynamic offline encryption method. The system 700 comprises an access device 102, a communication network 104, a coordination computer 112, and a key management server 114. These components are described in detail above, and their descriptions need not be repeated. FIG. 7 also shows a gateway computer 702 and a secure data store 704. The secure data store 704 can store sensitive data that a user may want to access. The sensitive data may be data such as medical records, personal information, banking information, etc. Access data that is used to access this sensitive data may include passwords, biometrics of a user, device IDs, etc. The gateway computer 707 can programmed to allow or deny access to the sensitive data in the secure data store 704, depending upon whether or not a user has supplied the correct credentials. Thus, the gateway computer 707 may also have a credentials database.

To access the secure data in the secure data store 704, a similar process, as described above with respect to FIGS. 4A and 4B can be used. However, instead authorizing a payment transaction, the gateway computer 702 can allow or deny access to secure data on the secure data store 704 based upon whether or not the correct credentials (e.g., a username and password, biometric, etc.) have been supplied by the access device 102.

Embodiments of the invention have a number of advantages. For example, embodiments of the invention can use a public/private key pair, and the key management server may decrypt the encrypted access data using a securely stored private key. Therefore, even if a hacker is able to gain access to the access device, the hacker will be unable to decrypt and obtain any of the access data. Further, since the public key is regularly changed and has a specific time to live, embodiments of the invention can limit the impact of a single data breach. Further, since sensitive data is either encrypted or deleted from the access device in embodiments if the invention, embodiments of the invention can comply with PCI-DSS standards. Also, sensitive encryption keys are not at risk in a potential data breach in embodiments of the invention, since the only keys stored in the access device are public keys. Still further, when successful connections can be made, normal online transactions can take place thus ensuring that many transactions are processed. This can be done while improving security when online transactions cannot be conducted.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
    receiving, by an access device, a first ephemeral public key corresponding to a first ephemeral private key, the first ephemeral public and private keys being previously generated by a key management server;
    receiving, by the access device, access data associated with a user;
    determining, by the access device, whether a successful connection with a remotely located processing computer can be made;
    when the access device determines that a successful connection cannot be made, then encrypting the access data with the first ephemeral public key to form encrypted access data;
    storing, in a memory device associated with the access device, the encrypted access data;
    determining, by the access device, that a successful connection to the remotely located processing computer can be made;
    transmitting, by the access device, the encrypted access data to the remotely located processing computer in an authorization request message, wherein the remotely located processing computer communicates with the key management server to decrypt the access data;
    receiving, by the access device, an authorization response message from the remotely located processing computer; and
    receiving, by the access device, a second ephemeral public key corresponding to a second ephemeral private key, the second ephemeral public and private keys being previously generated by the key management server.

2. The method of claim 1, wherein the remotely located processing computer is a network computer, and wherein the network computer transmits the authorization request message including decrypted access data and sends the authorization request message to an authorizing entity computer for authorization.

3. The method of claim 1, wherein the key management server deletes the first ephemeral public key from memory after the access device receives the second ephemeral public key.

4. The method of claim 1, wherein determining, by the access device, whether a successful connection to the remotely located processing computer can be made, includes attempting to transmit an initial authorization request message to the remotely located processing computer, and receiving an error message in response to the initial authorization request message.

5. The method of claim 1, wherein determining, by the access device, whether a successful connection to the remotely located processing computer can be made, includes determining by the access device that a connection between the remotely located processing computer and the access device is insufficient to successfully transmit request and response messages, without actually transmitting a request message to the remotely located processing computer.

6. The method of claim 1, wherein the authorization response message comprises a digital signature, the digital signature created by the key management server using the first ephemeral private key.

7. An access device comprising:
    a processor;
    a memory device; and
    a computer-readable medium coupled to the processor, the computer-readable medium comprising code executable by the processor for implementing a method comprising:
    receiving a first ephemeral public key corresponding to a first ephemeral private key, the first ephemeral public and private keys being previously generated by a key management server;
    receiving access data associated with a user;
    determining whether a successful connection with a remotely located processing computer can be made;

when the access device determines that a successful connection cannot be made, then encrypting the access data with the first ephemeral public key to form encrypted access data;

storing, in the memory device associated with the access device, the encrypted access data;

determining that a successful connection to the remotely located processing computer can be made;

transmitting the encrypted access data to the remotely located processing computer in an authorization request message, wherein the remotely located processing computer communicates with the key management server to decrypt the access data;

receiving an authorization response message from the remotely located processing computer; and receiving a second ephemeral public key corresponding to a second ephemeral private key, the second ephemeral public and private keys being previously generated by the key management server.

8. The access device of claim 7, wherein the remotely located processing computer is a network computer, and wherein the network computer transmits the authorization request message including decrypted access data and sends the authorization request message to an authorizing entity computer for authorization.

9. The access device of claim 7, wherein the key management server deletes the first ephemeral public key from memory after the access device receives the second ephemeral public key.

10. The access device of claim 7, wherein determining whether a successful connection to the remotely located processing computer can be made, includes attempting to transmit an initial authorization request message to the remotely located processing computer, and receiving an error message in response to the initial authorization request message.

11. The access device of claim 7, wherein determining whether a successful connection to the remotely located processing computer can be made, includes determining that a connection between the remotely located processing computer and the access device is insufficient to successfully transmit request and response messages, without actually transmitting a request message to the remotely located processing computer.

12. The access device of claim 7, wherein the authorization response message comprises a digital signature, the digital signature created by the key management server using the first ephemeral private key.

13. A method comprising:

receiving, by a key management server, a first key request message comprising a request for a first ephemeral public key corresponding to a first ephemeral private key;

transmitting, by the key management server, the first ephemeral public key corresponding to the first ephemeral private key, the first ephemeral public and private keys being previously generated by the key management server, to an access device;

receiving, by the key management server, a decryption request message to decrypt encrypted access data using the first ephemeral private key corresponding to the first ephemeral public key, from a remotely located processing computer;

decrypting, by the key management server, the encrypted access data;

transmitting, by the key management server, decrypted access data to the remotely located processing computer;

receiving, by the key management server, a second key request message comprising a request for a second ephemeral public key corresponding to a second ephemeral private key; and transmitting, by the key management server, the second ephemeral public key corresponding to the second ephemeral private key, the second ephemeral public and private keys being previously generated by the key management server, to the access device.

14. The method of claim 13, wherein the access device comprises a card reader.

15. The method of claim 13, wherein the key management server deletes the first ephemeral public and private keys from memory after the access device received the second ephemeral public key.

16. The method of claim 13, wherein the key management server generates a digital signature using the first ephemeral private key.

17. The method of claim 13, wherein the remotely located processing computer is a network computer disposed between a transport computer and an authorizing entity computer.

18. The method of claim 13, wherein the first key request message is from the access device.

19. The method of claim 18, wherein the access device is on an airplane.

20. The method of claim 13, wherein the remotely located processing computer is an authorizing entity computer.

* * * * *